United States Patent
Lee

(10) Patent No.: US 6,717,698 B1
(45) Date of Patent: Apr. 6, 2004

(54) TONE SCALE PROCESSING BASED ON IMAGE MODULATION ACTIVITY

(75) Inventor: Hsien-Che Lee, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/496,635

(22) Filed: Feb. 2, 2000

(51) Int. Cl.$^7$ .............................................. G06K 15/00
(52) U.S. Cl. ..................................... 358/1.9; 358/3.23
(58) Field of Search ....................... 358/1.9, 2.1, 3.01, 358/3.21, 3.23

(56) References Cited

U.S. PATENT DOCUMENTS

| | | | |
|---|---|---|---|
| 4,654,722 A | | 3/1987 | Alkofer ...................... 358/284 |
| 4,945,406 A | | 7/1990 | Cok ............................ 358/80 |
| 5,012,333 A | | 4/1991 | Lee et al. .................... 358/80 |
| 5,016,043 A | | 5/1991 | Kraft et al. .................. 355/38 |
| 5,544,258 A | * | 8/1996 | Levien ....................... 382/169 |
| 5,633,511 A | | 5/1997 | Lee et al. ................... 250/587 |
| 5,822,453 A | | 10/1998 | Lee et al. .................. 382/169 |
| 5,923,775 A | | 7/1999 | Snyder et al. .............. 382/172 |
| 5,978,106 A | * | 11/1999 | Hayashi ..................... 358/518 |
| 6,097,836 A | * | 8/2000 | Inoue ........................ 382/165 |
| 6,236,751 B1 | * | 5/2001 | Farrell ....................... 382/168 |
| 6,285,798 B1 | * | 9/2001 | Lee ............................ 382/260 |
| 6,438,264 B1 | * | 8/2002 | Ballagher et al. .......... 382/167 |

FOREIGN PATENT DOCUMENTS

| JP | 02000115538 A | * | 4/2000 | .......... H04N/1/407 |
|---|---|---|---|---|

OTHER PUBLICATIONS

"Digital Image Processing for the Frontier350 Digital Minilab" by Hiroaki Nakamura. IS&T's 1999 PICS Conference, pp. 96–99.

"Exposure Determination Methods for Color Printing: The Concept of Optimum Correction Level" by C.J. Bartleson and R.W. Huboi. Apr. 1956 Journal of the SMPTE, vol. 65, pp. 205–215.

"Estimation of Noise in Images: An Evaluation" by S. I. Olsen. CVGIP: Graphical Meldesl and Image Processing, vol. 55, No. 4, Jul., pp. 319–323, 1993.

U.S. patent application Ser. No. 09/112,661, Lee, filed Jul. 9, 1998.

U.S. patent application Ser. No. 09/210,107, Lee, filed Dec. 11, 1998.

* cited by examiner

Primary Examiner—Jerome Grant, II
(74) Attorney, Agent, or Firm—David M. Woods

(57) ABSTRACT

A method for generating an image-dependent tone scale curve includes (a) computing an image activity histogram for an input image value as a function of the number of neighboring pixels that have a predetermined amount of image modulation exclusive of a predetermined noise modulation; and (b) constructing an image-dependent tone scale curve from the image activity histogram. The predetermined amount of image modulation may comprise any image value within two specified intervals each bounded by a noise threshold and a modulation threshold. In another aspect, a tone scale curve that optimizes the rendering of image activity is generated under one or more constraints. More particularly, one or more slope-limit constraints and/or point constraints are established and then a tone scale function is constructed by applying the slope-limit constraints in a tone scale derivative space. An image activity histogram is computed and applied to the tone scale slopefunction. Finally, the tone scale slope function is integrated to generate the tone scale curve.

25 Claims, 8 Drawing Sheets

Image Activity Measure

| | | | | |
|---|---|---|---|---|
| (769) | (518) | 594 | (675) | (679) |
| 1076 | 617 | (546) | 593 | (718) |
| 956 | (745) | (593) | 601 | (739) |
| 562 | 827 | 814 | 799 | 1110 |
| (490) | 612 | (687) | 933 | 1578 | noise threshold = 40 modulation threshold = 200

Activity[593] = Activity[593] + 10

TONE SCALE PROCESSING BASED ON IMAGE MODULATION ACTIVITY

FIELD OF THE INVENTION

This invention relates to the field of image processing, and in particular to tone scale processing of digital images.

BACKGROUND OF THE INVENTION

The dynamic range of a scene or an image is the ratio of its maximum intensity to its minimum intensity. Similarly, the dynamic range of a visual display, such as a color monitor, or a print medium, such as photographic paper, is the ratio of the maximum luminance to the minimum luminance that is rendered on the display or the print medium. In conventional optical printing, when an image has a larger dynamic range than can be rendered on an output medium, there will be loss of details in the rendering process, especially in the highlight or shadow areas. Digital image processing can be used to preserve the image details by compressing the input dynamic range only on the very low frequency component in the input image. U.S. Pat. No. 5,012,333 teaches a method for such an operation. An input image is decomposed into a high frequency component and a low frequency component. The image value in the low frequency component is mapped through a lookup table which compresses the dynamic range by a tone scale curve with an average slope less than one. A tone scale curve, as the term is used herein, is a function that maps an input image value to an output image value. When the units used for the input and the output image values are both proportional to log exposure or lightness of the scene, the slope of the tone scale curve is known to correlate well with the perceived contrast of the image.

It is desirable to have an automatic method of constructing an image-dependent tone scale curve for a given input digital image such that the dynamic range of the input image is so compressed as to render most image details visible. For example, if the image contains a highlight area that is illuminated by bright sunlight and a shadow area that is illuminated only by dim skylight, it would be desirable that detail in both areas would be rendered visible. Because of the large difference in the luminance level of the two illuminations, the tonal range of the highlight is well separated from that of the shadow. If the histogram of the input image values is examined, one can see a gap between the highlight and the shadow clusters. In this case, the tonal range corresponding to the gap can be greatly compressed without creating undesirable artifacts because there are no pixels within that tonal range. The limited output dynamic range should be fully allocated to the highlight tonal range and to the shadow tonal range, with nothing wasted for the tonal range corresponding to the gap in between.

Prior algorithms for dynamic range allocation, such as the well known method of histogram equalization, are based on the histogram of pixel values of the entire image. There are two drawbacks with this type of approach: (a) a large uniform area (such as sky or a wall) in the image will cause a large output dynamic range to be allocated for that area. This is not desirable because the area is uniform and does not need much output dynamic range; (b) the pixels corresponding to a large peak in the histogram may not be spatially adjacent to each other in the image. Although collectively, their number may be very large, the image values of their neighboring pixels may be quite different from them and therefore they do not need a large output range for rendering.

To solve the first of these problems, U.S. Pat. No. 4,654,722 teaches a method of using a Laplacian operator to select only edge pixels for inclusion in the histogram. Therefore, most pixels in the large uniform areas are not included. Such a method can reduce the problem of large uniform areas, but does not truly measure image signal modulations. U.S. Pat. No. 5,633,511 teaches a method that is based on the histogram of image activities, not on image values. Image activity measures how much signal modulation takes place at each image value. Although the '511 patent teaches the use of image activity to set the parameter values in a family of tone scale curves, it does not teach the use of image activity to allocate the output dynamic range to the tone ranges in the input image values so that an image-dependent tone scale curve of a non-predetermined shape can be constructed.

SUMMARY OF THE INVENTION

The present invention is directed to overcoming one or more of the problems set forth above. Briefly summarized, according to one aspect of the present invention, a method of generating an image-dependent tone scale curve includes (a) computing an image activity histogram for an input image value as a function of the number of neighboring pixels that have a predetermined amount of image modulation exclusive of a predetermined noise modulation; and (b) constructing an image-dependent tone scale curve from the image activity histogram. The predetermined amount of image modulation may comprise any image value within two specified intervals each bounded by a noise threshold and amodulation threshold.

In another aspect of the present invention, the invention involves a method of generating a tone scale curve that optimizes the rendering of image activity under one or more constraints. More particularly, the invention involves establishing one or more slope-limit constraints and then constructing a tone scale slope function by applying the slope-limit constraints in a tone scale derivative space. An image activity histogram is computed and applied to the tone scale slope function. Finally, the tone scale slope function is integrated to generate the tone scale curve. In yet another aspect, the invention involves establishing one or more point constraints and then constructing a tone scale slope function in a piecewise manner by applying the point constraints in the tone scale derivative space. The image activity histogram is computed and applied to the tone scale slope function, and the tone scale slope function is integrated to generate the tone scale curve.

In a further aspect, the output dynamic range (Vmin, Vmax) of an output medium is measured. For an input digital image, two histograms are computed: the image activity histogram and an image value histogram. The minimum image value Umin and the maximum value Umax of the input image are determined from its image value histogram. A balance point is also determined for the image, such that a certain image value Uaim is tentatively mapped to itself with an output value Vaim=Uaim. A white point, Uwhite, is also determined by detecting the presence of any white object in the image. The input as well as the output dynamic range are both partitioned into the upper range and the lower range by the mapping of a chosen anchor point.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing tone scale correction are well known, the present description will be directed in particular to attributes forming part of, or cooperating more directly with, apparatus in accordance with the present invention. System attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system and methodology as described in the following materials, all such software implementation needed for practice of the invention is conventional and within the ordinary skill in such arts. If the invention is implemented as a computer program, the program may be stored in conventional computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

This invention relates to a method of constructing a tone scale curve for rendering digital images on a display or a print medium that has a limited output dynamic range. The invention can be used in various applications where digital images are processed and displayed or printed, such as in digital printing, photofinishing, medical imaging, video imaging, motion pictures, and graphic arts. This invention applies to all image display devices (such as cathode-ray tube monitors or liquid-crystal displays) or print media (such as photographic paper or inkjet paper). In order to simplify the description, photographic paper will be used as the output medium in the following discussion.

Figure 1:
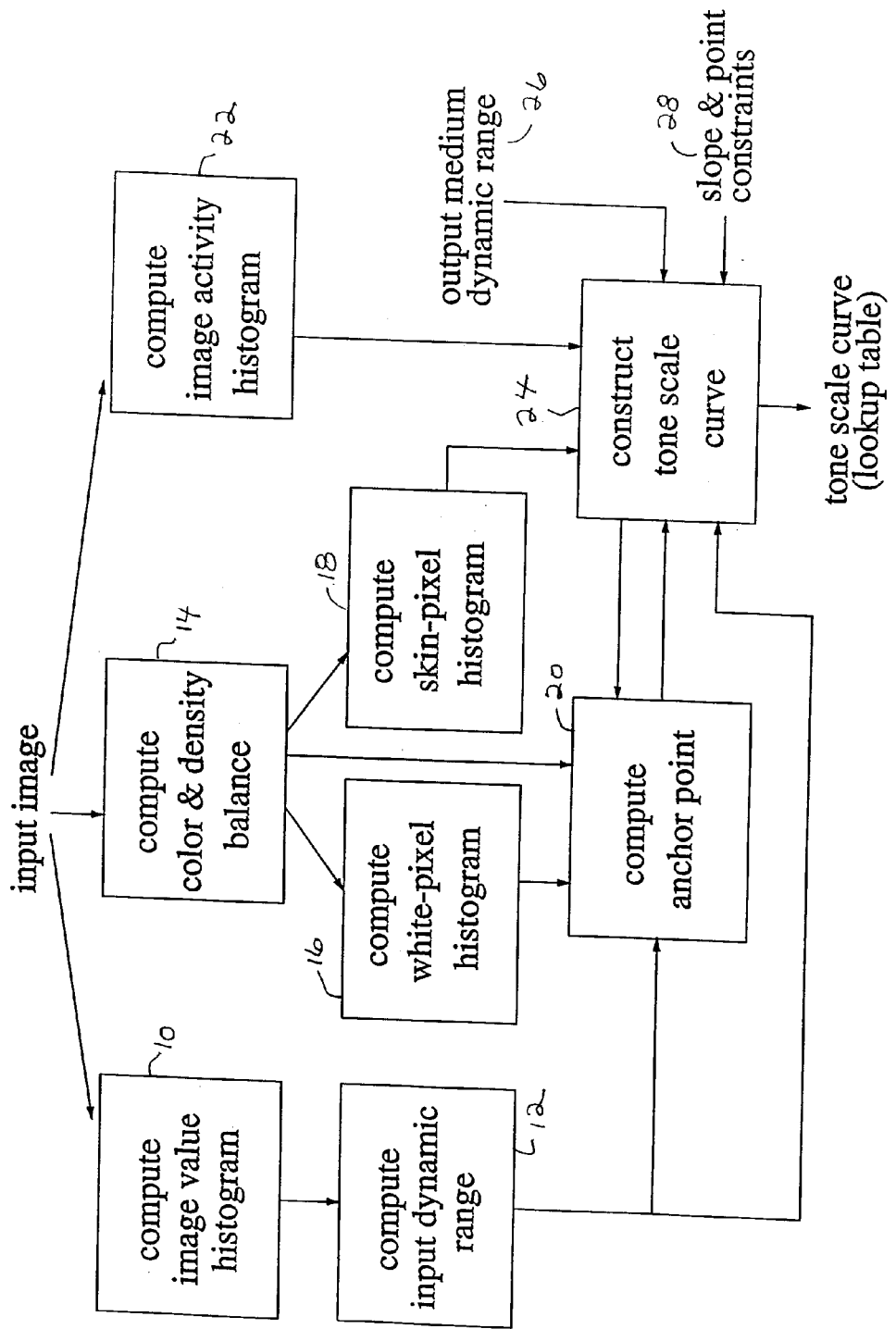
FIG. 1 is a diagram of a method for tone scale construction based on image modulation activity according to the invention.

FIG. 1 is a block diagram showing the overall methodology of the invention. In an image value histogram generation stage 10, an input image is used to compute an image value histogram, from which a computation stage 12 determines the input dynamic range. In a scene balance stage 14, a scene balance algorithm is used to compute the color and density balance for the input image. Such scene balance algorithms are well-known and described in U.S. Pat. Nos. 4,945,406 and 5,016,043 and in C. J. Bartleson and R. W. Huboi, "Exposure Determination Methods for Color Printing: The Concept of Optimum Correction Level", *J. SMPTE*, 65:205–215 (1956), which are incorporated herein by reference. The output of the scene balance algorithm includes color balance points for the red, green, blue records, from which the algorithm computes the luminance balance point (aim point) and the chrominance balance point. These balance points are used in the histogram computation stages 16 and 18 to compute a white-pixel histogram and a skin-pixel histogram, respectively. In the image activity stage 22, an image activity histogram is computed from the input image. In one of the main aspects of the invention, a tone scale construction stage 24 constructs a tone scale curve, using the information computed from the other stages and also parameters 26 about the dynamic range of the output medium input and, as will also be described later, several slope and point constraints 28. In the preferred embodiment of this invention, a balance point derived from the color and density balance algorithm 14 and the white point requirements derived from the white-pixel histogram 16 are merged into one anchor point constraint which is solved iteratively in an anchor point stage 20 and used in the tone scale construction, as will also be described later.

Figure 2:
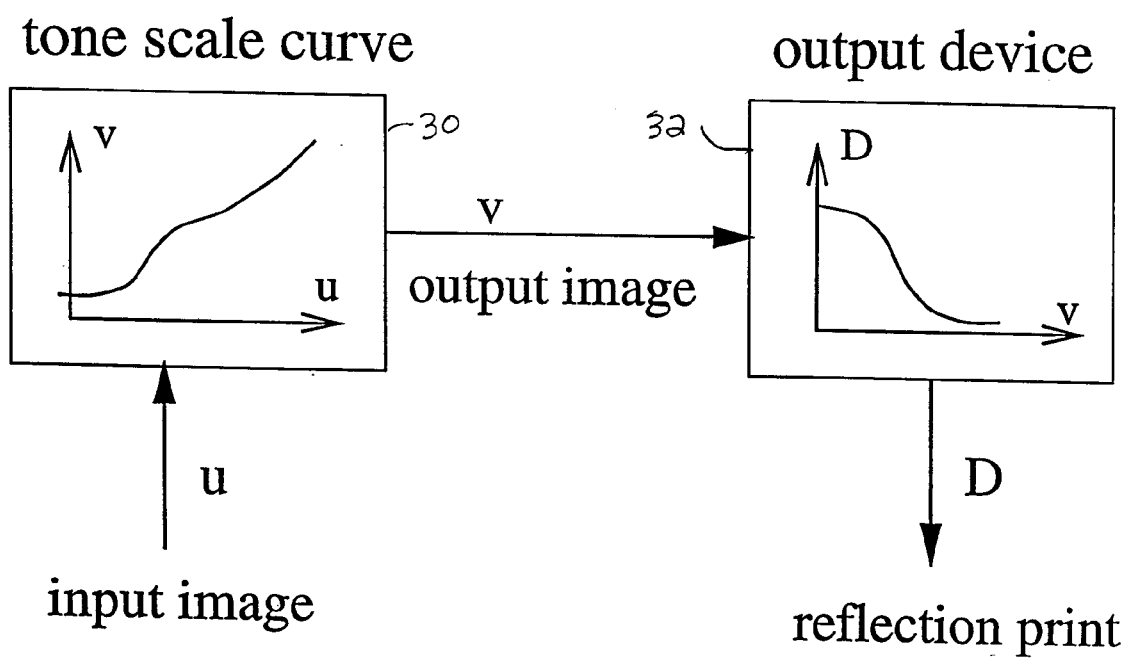
FIG. 2 is a block diagram showing the function of a tone scale curve for mapping an input image value to an output image value.

FIG. 2 shows the function of a tone scale curve 30, which maps every input image value u to an output image value v, which is used by the output device to determine the density of the reflection print. Then, as shown in an output curve 32, the output device reads the output image value v and produces a density D on the reflection print of the image. If the input image is calibrated in log exposure of the scene, then u has the unit of log exposure. If the output device, such as a laser writer, is also calibrated to receive log exposure as the input metric, then v also has the unit of log exposure. The tone scale curve is thus a mapping from log exposure to log exposure. If the input image value u is in printing density of a color negative film, and the output device is also calibrated to receive printing density value v, then the tone scale curve is a mapping from printing density to printing density. Therefore, for purposes of this invention, the input and the output variables of the tone scale curve have the same physical units. The same tone scale curve can be used to drive different output devices if they are calibrated to receive the metric that the input image uses. The choice of the metric to use is flexible as long as the slope of the tone scale curve is correlated with the perceived image contrast. For example, relative log scene exposure, printing density, and relative scene lightness (such as L* in CIELAB space), are all valid metrics for purposes of this invention.

Figure 3:
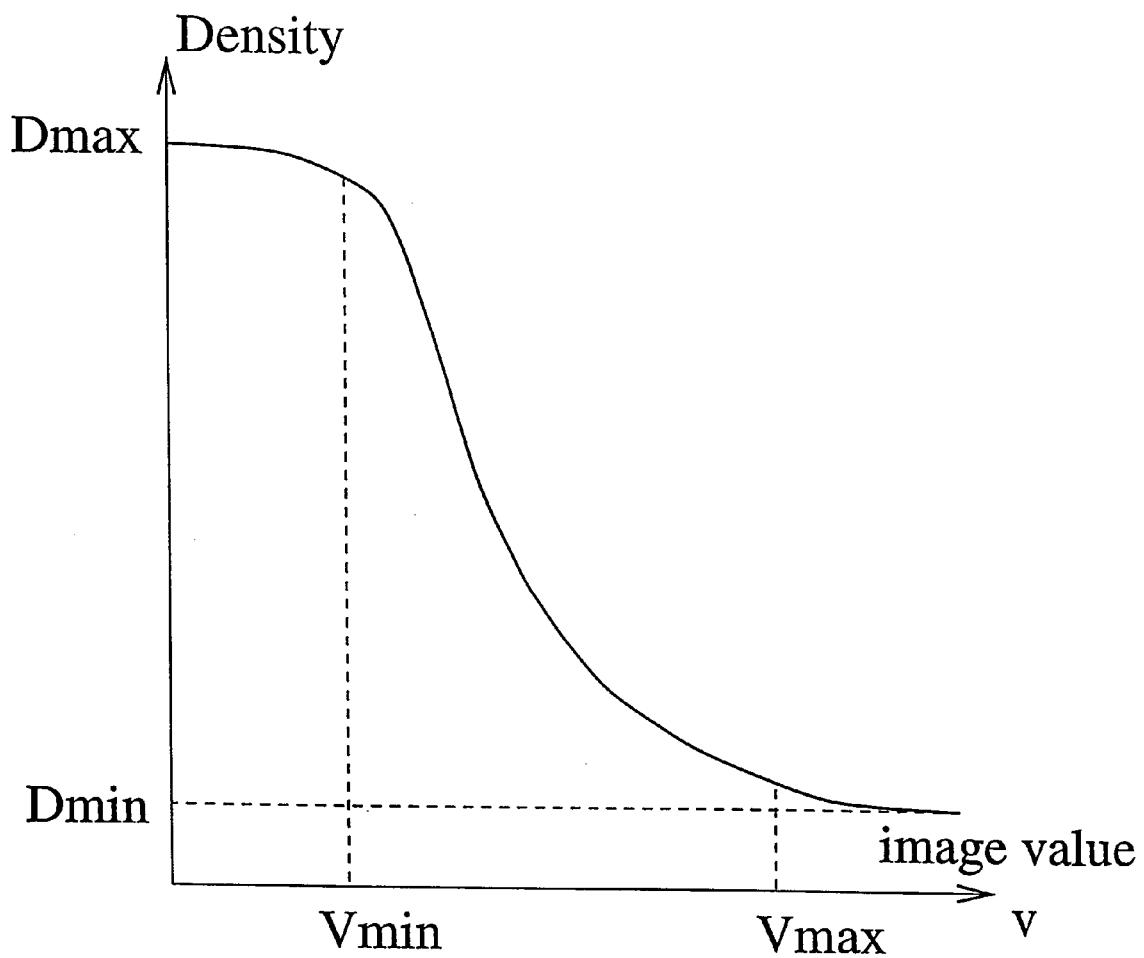
FIG. 3 is an example of the characteristics of an output device, showing how the device input values, specified by an output dynamic range represented by the device input values Vmin and Vmax, are printed close to the extreme densities Dmin and Dmax on the output medium.

The output dynamic range is determined for the output medium in terms of its maximum and minimum device input values v that will be printed to certain chosen densities. FIG. 3 shows an example of an output curve with specific output device/medium characteristics. The minimum density Dmin and the maximum density Dmax are extreme density values that the output device can produce. The two device input values Vmin and Vmax are mapped to density values close to, but may or may not be equal to, the extreme densities, depending upon the margins that are reserved to produce highlight and shadow modulations. In this example, Vmin and Vmax specify the available output dynamic range for the tone scale curve 30 (FIG. 2). The input dynamic range is determined from the input image by the input image histogram stage 10 and dynamic range computation stage 12 (FIG. 1). The histogram of the input image values is accumulated in the stage 10 and, in practice, the 0.2 and the 99.8 percentile values, referred to as Umin and Umax, are taken in the stage 12 to define the input dynamic range. Other percentile values, of course, may be used to define the input dynamic range.

Figure 4:
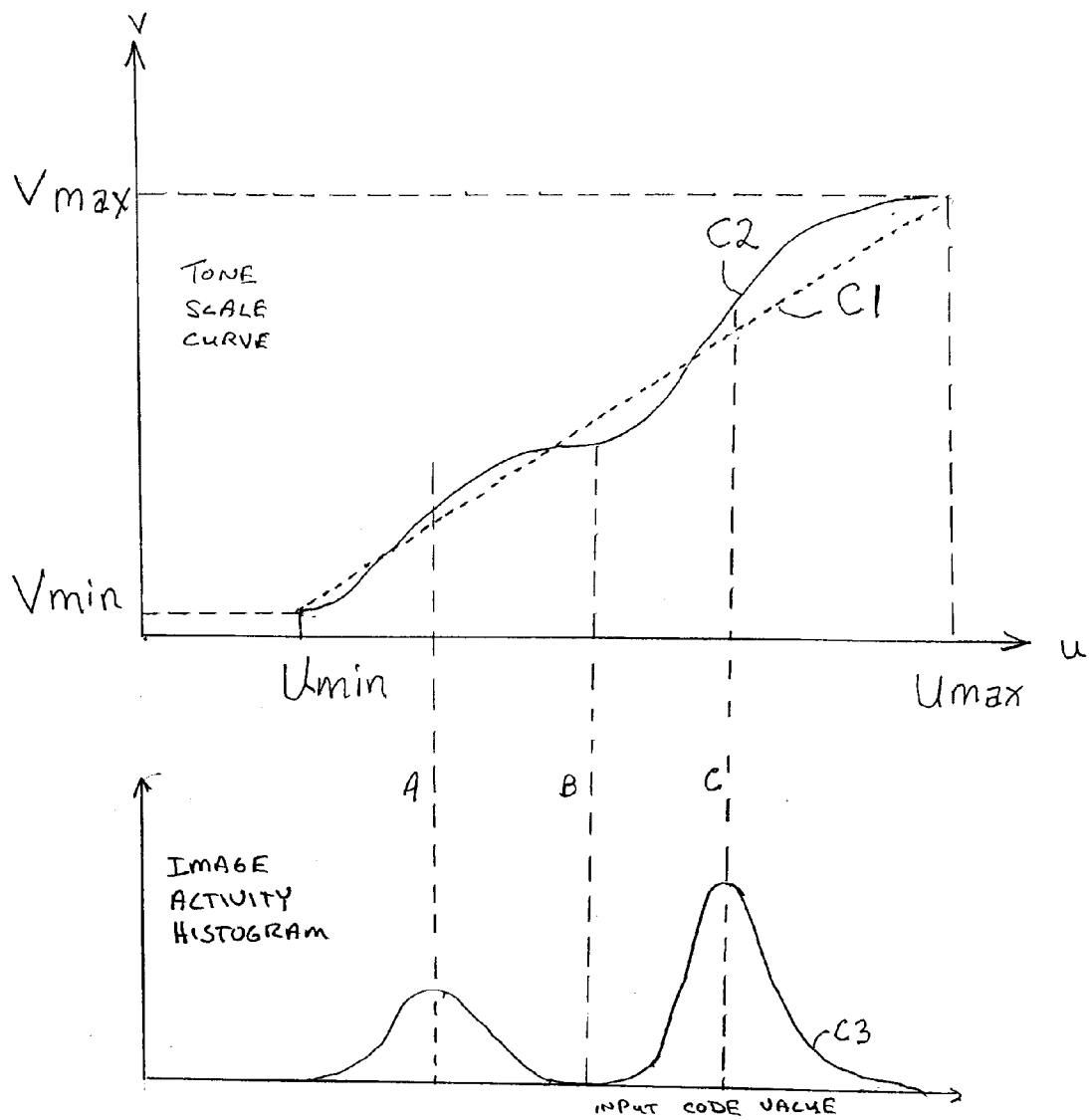
FIG. 4 shows an example of how a tone scale curve is constructed from an image activity histogram.

The basic idea of the invention is described with reference to the tone scale curve and image activity histogram shown in FIG. 4. The input dynamic range is shown to be from Umin to Umax, and the output dynamic range is shown to be from Vmin to Vmax. The simplest tone scale method to map the input to the output is through the dashed straight line C1, which allocates the available output dynamic range Vmax-Vmin uniformly to the input dynamic range Umax-Umin, regardless of the content of the image. One of the key features of this invention is that the image activity should be computed for each input image value and its histogram should be used to guide the allocation of the available output dynamic range to the input dynamic range. More particularly, as will be described, the image activity should be based on a specified degree of image modulation in the neighborhood of each pixel. Therefore, whenever the image activity is low for a range of input image values, the slope of the tone scale curve should be made small. Whenever, the image activity is high, the slope should be increased proportional to the height of the image activity histogram. In FIG. 4, the bottom curve C3 shows the image activity histogram of an input image. The top curve C2 shows a tone scale curve that has a high local slope at regions A and C for image values where there are a lot of activities in the input histogram and a low slope at region B for image values where there are few activities in the input histogram.

The image activity can be calculated in a number of ways. For example, the response at a pixel of the input image to a bandpass or a highpass filter can be used as a measure of image activity for the image value at that pixel. In U.S. Pat. No. 5,633,511, which is incorporated herein by reference, image activity is measured by determining activity values based on level-crossing, image value co-occurrence, and the use of edge gradient and Laplacian operators. While these techniques work well with edges, they do not adequately measure texture—such as would be found in hair, grass and fabric micropatterns. In order to measure both edges and textures, an image modulation activity measure is used according to the invention to find, in an N×N neighborhood, the number of pixels in the neighborhood of the center pixel that have a predetermined image modulation exclusive of noise modulation. Pixels that are spatially adjacent and have similar image values can be rendered more distinguishable if the local slope of the tone scale curve is made high at the image value. In a uniform area, the image values in the neighborhood will fluctuate because of noise. Therefore, pixels that have image values that are within two or three noise standard deviations from the center pixel should not be counted. Likewise, pixels that have image values far away from the center pixel also should not be counted because they are already quite different from the center pixel—i.e., there is no need to adjust the local slope to make their differences more visible. Therefore, in computing the image activity, two boundaries are set: a lower bound (determined by noise) and an upper bound (determined by the system minimum contrast requirement). The activity value for each central pixel image value is then comprised of the number of bounded pixels, i.e., that are within the aforementioned upper and lower bounds for an N×N region around the central pixel, and the histogram is then incremented for each input image value by the number of bounded pixels for the given image value of the central pixel.

Figure 6:
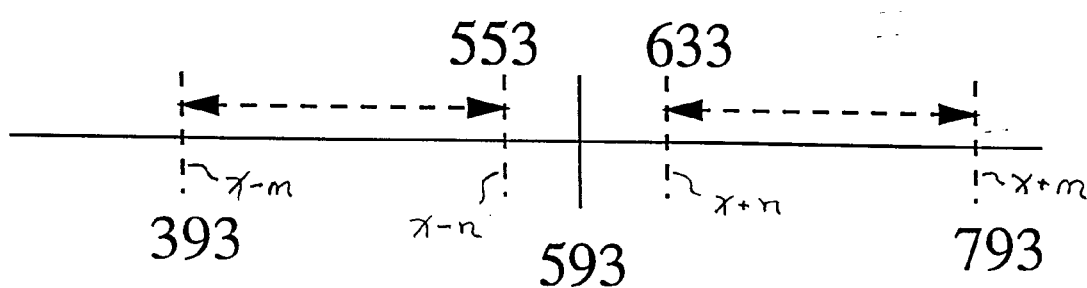
FIG. 6 shows an example of a preferred measure of image activity used for the image activity histogram shown in FIG. 4.

Thus, in the preferred embodiment of the invention, the image activity is measured by counting, for each pixel in the input image, the number of neighboring pixels that have an image value within the two aforementioned specified intervals, which are bounded by noise thresholds and modulation thresholds. Let the image value be x, the noise threshold be n, and the modulation threshold be m. Then the two intervals are specified by [x−m, x−n] and [x+n, x+m]. The noise threshold can be determined for each input type, e.g., by measuring the granularity of various films or by a noise estimation algorithm that operates on the input image. Typical noise estimation algorithms are described in U.S. Pat. No. 5,923,775 and in S. I. Olsen, "Estimation of Noise in Images: An Evaluation", *CVGIP: Graphic Models and Image Processing*, 55, 4, 319–323, 1993. The modulation threshold is not a sensitive parameter. For an image calibrated in 1000*log exposure, and represented by integers between 0 and 4095, a value of m=200 is found to give good performance. FIG. 6 shows an example of how the image activity is calculated for a 5×5 window with n=40 and m=200. There are 10 neighboring pixels in the window that have values within the two specified intervals [x−200, x−40] and [x+40, x+200], where x=593 is the image value of the center pixel. Therefore, the image activity is 10, and the histogram is incremented by 10 for the image value 593.

Furthermore, in order to produce pleasing tone reproduction it is desirable to impose several additional constraints on this basic idea in the construction of the tone scale curve according to the image activity histogram. These constraints are discussed below.

The first constraint is that certain input values have to be mapped to certain output values so that the lightness of the reproduced image will be properly rendered. This is called the density balance problem. For example, the faces in the image have to be printed within a proper lightness range. Otherwise, the image will appear to be too dark or too light. As shown in FIG. 2, a scene balance algorithm stage 14 can be integrated with this invention in order to compute the color and density balance points. Alternatively, a balance (aim) point Uaim can be determined from the image by a separate scene balance algorithm and the balance (aim) point Uaim would then be an input parameter to the tone scale construction process according to this invention. Typically, the balance (aim) point is set to be at or near the 18% gray point.

The second constraint is that main subjects in the image have to be rendered with proper contrast. Most of the time, the main subjects in the image are people. In this invention, the input tonal range that contains potential skin-color pixels is detected (by the skin-pixel histogram stage 18 shown in FIG. 1 and described below) and the tone scale slope within that range is constrained to have user specified minimum and maximum slopes.

The third constraint is that a white object in the image has to be rendered with a sufficiently high reflectance factor in the reflection print. Otherwise, the white object will appear to be grayish. Consumer studies show that the sensitivity to this requirement varies significantly from person to person. In the preferred embodiment of the invention, a white object detector (the white-pixel histogram stage 16 shown in FIG. 1 and described below) is used to detect the presence of white objects in the image. Typically, the white point is set to be about two stops, or 0.6 log exposure, above the balance (aim) point. If any white object is detected, its corresponding input image value (white point) is constrained to be mapped to some high output image value. In practice, the input white point is mapped to itself so that its lightness will not be reduced by the tone scale curve.

A fourth constraint is that the highlight contrast and the shadow contrast can have some minimum slope values different from the user specified mid-tone minimum contrast. This is necessary so that the output look can be controlled by the user. For example, it is often desirable to raise the shadow contrast because its reproduction is affected most seriously by the viewing flare.

Figure 5:
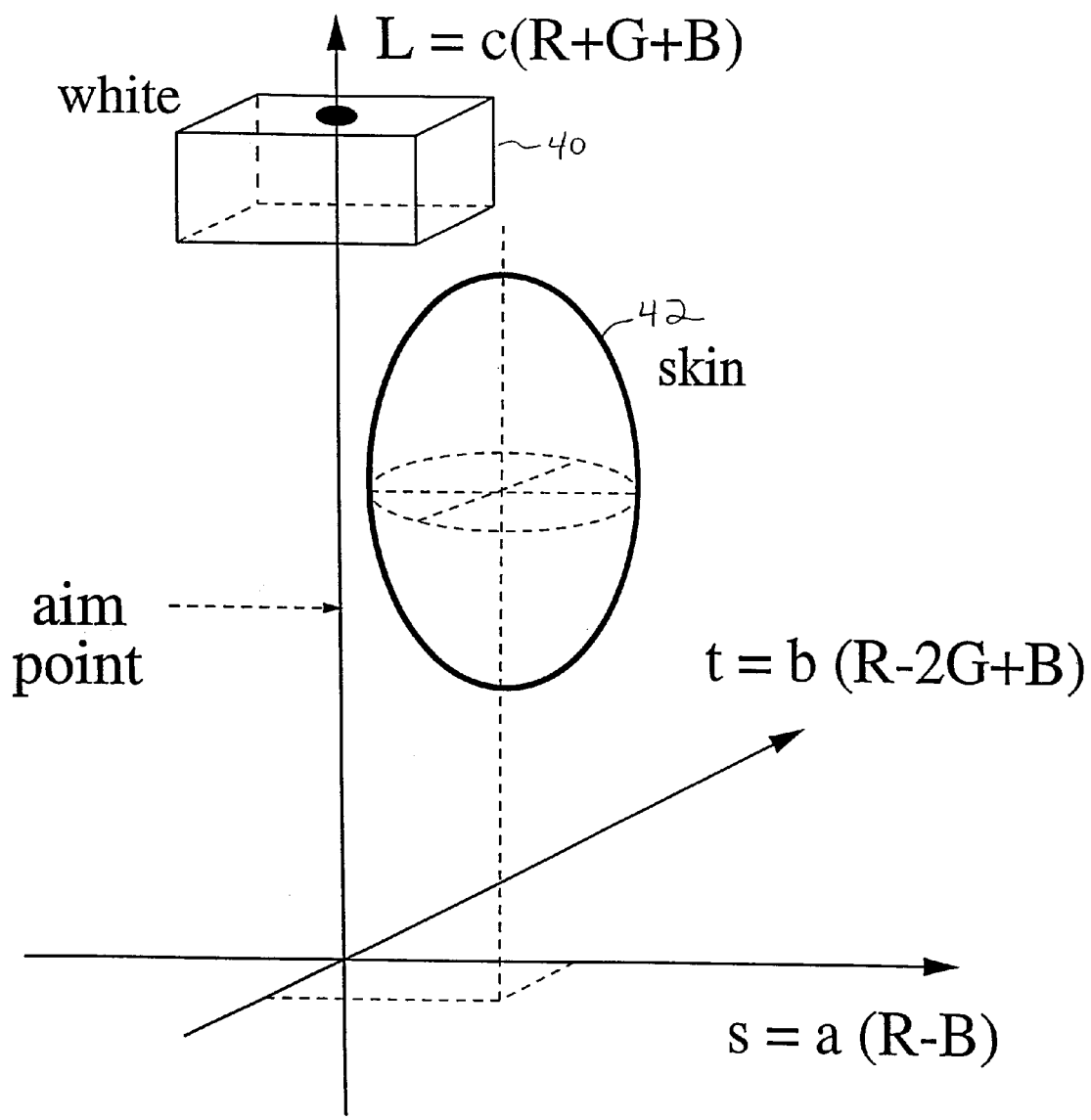
FIG. 5 is a schematic diagram of conditional probability distributions of white points and skin points in a luminance-chrominance color space.

The detection of skin-pixels and white-pixels is accomplished by compiling the conditional probability distributions of the desired color pixels from a large image database. For each pixel in the input image, its conditional probability of being skin-color or white-color is used to classify the pixel into either a skin-pixel histogram or a white-pixel histogram (this same technique involving conditional probability can also be used to classify other pixels into other histograms appropriate for other colors). The skin-pixel histogram is used to compute the tonal range of skin and the white-pixel histogram is used to compute the tonal range of white objects. These two tonal ranges are used as the skin contrast constraint and the white point constraint in the tone scale curve construction. FIG. 5 is a schematic diagram of the conditional white distribution 40 and skin distribution 42 in (L,s,t) color space, where L=c(R+G+B); s=a(R−b); t=b(R−2G+B); a, b and c are constants; and R, G and B are image values proportional to relative log scene exposure. The actual shapes of the conditional distribution are determined by the compiled statistics. They are not necessarily ellipsoid or rectangular.

The first constraint of the balance point and the third constraint of the white point can be imposed simultaneously. Then the tone scale curve has to pass both points. This means that the curve is constructed piecewise in three pieces: one piece below the balance point, one piece above the white point, and one piece between the two points. For many images, the three-piece construction leaves little room to compress the highlight and the shadow tonal ranges. In the preferred embodiment of this invention, the balance point and the white point requirements are merged into one constraint which is solved iteratively. An anchor point is initially set at the white point, the curve is constructed piecewise as two pieces, one above the anchor point and one below. The balance point is then mapped through the constructed curve. If it is mapped too far away from its aim point, then the anchor point is adjusted and a new curve is constructed through the new anchor point. This process is iterated several times until the anchor point has been adjusted so that the balance point is mapped within the specified distance of its aim point.

The above description shows that there are many constraints to be satisfied in the construction of the tone scale curve based on the image activity histogram. Therefore another key feature of this invention is a method of constructing a curve that must simultaneously satisfy several slope and point constraints. This is difficult to accomplish in tone scale space, but easier to satisfy in a tone scale derivative space, that is, with a tone scale slope function. Therefore, in the preferred embodiment of the invention, the constraints are satisfied in derivative space and the tone scale curve is constructed by integrating its slope function. Since the slope function is the function that is computed first, all the slope constraints are easy to impose. The point constraints are also easy to enforce by using a scale factor which is adjusted so that when the slope function is integrated, the resulting curve passes through the required point.

Figure 7:
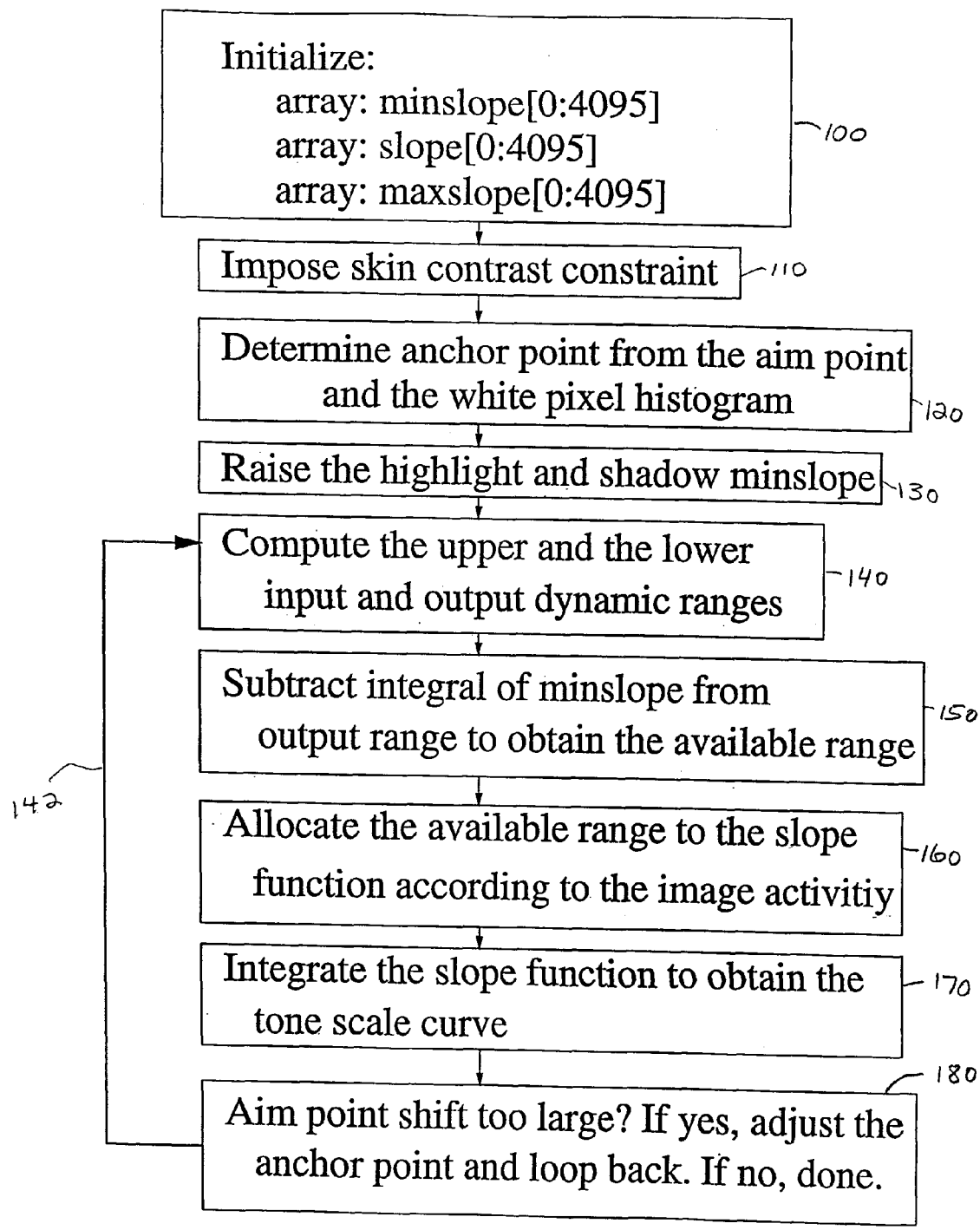
FIG. 7 is a diagram of a preferred tone scale curve construction process according to the invention.

FIG. 7 shows a block diagram of the steps of the preferred embodiment of this invention for constructing a tone scale curve based on the image activity histogram and the aforementioned constraints. The image values are assumed to be integers between 0 and 4095, representing 1000*log exposure, or 1000*printing density. The first step 100 is to initialize three working arrays. The minslope array is used by the user and the computer algorithm to impose the minimum allowed slope for each image value. The maxslope array is for imposing the maximum allowed slope. The slope array is the first derivative of the tone scale curve to be constructed. The next step 110 is to impose the minimum and maximum skin contrasts for the tonal range of the detected skin histogram by setting the minimum slopes and the maximum slopes for the image values corresponding to skin in the minslope array and the maxslope array. In the next step 120, the balance (aim) point and the white pixel histogram are used to initialize the anchor point. In order to compensate for viewing flare or some undesirable characteristics of the output device, the minimum slope in the highlight and shadow areas can be raised in step 130 by setting the desired values in the minslope array. At this stage, other kinds of constraints can also be imposed in a similar manner. The algorithm then starts an iterative process 142 to construct the tone scale curve. In performing each iteration, the balance (aim) point as mapped by the computed tone scale curve is checked in step 180 to see if it is shifted too far away from its original aim. If the shift is too large, then the computer adjusts the anchor point, and goes into the next iteration, until a tone scale curve has been achieved which does not produce a shift in aim point larger than specified by the user. This iterative process is guaranteed to converge in N steps by adjusting the anchor point closer to the aim point by one-Nth the initial distance between the anchor point and the aim point.

It is helpful at this point to understand that the object of this invention is to construct an image-dependent tone scale curve such that:

The input dynamic range is always mapped by the curve to a dynamic range smaller or equal to the dynamic range of the output medium.

If the input upper range is greater than the output upper range, then a curve with average slope less than 1.0 is constructed so that the instantaneous slope is a function of the height of the image activity histogram, and Umax is mapped to Vmax, subject to the user specified slope and point constraints.

If the input upper range is less than or equal to the output upper range, then a straightline with slope greater than or equal to 1.0 is used for the upper part of the tone scale curve.

If the input lower range is greater than the output lower range, then a curve with average slope less than 1.0 is constructed so that the instantaneous slope is a function of the height of the image activity histogram, and Umin is mapped to Vmin, subject to the user specified slope and point constraints.

If the input lower range is less than or equal to the output lower range, then a straightline with slope greater than or equal to 1.0 is used for the lower part of the tone scale curve.

The slope and point constraints are either specified by the user or generated by object detection modules in the tone scale construction algorithm, such as in the skin detection stage 18 and white object detection stage 16 shown in FIG. 1.

Referring again to FIG. 7, the construction of the tone scale curve starts in step 140 by partitioning the input and the output dynamic range into the upper and the lower range at the anchor point, which is mapped into itself. Therefore the tone scale curve is constructed in two pieces, one for the upper range and one for the lower range, with the same procedure. Here we describe the procedure with respect to the upper range. First, the minslope array is copied over to the slope array and the integral of the minslope array in the upper input range is subtracted in step 150 from the available upper output dynamic range. If the result is zero or negative, then the upper curve is constructed by integrating the minslope array. If the result is greater than zero, then the difference is distributed to the upper input range according to the image activity histogram in the upper range. Image values that have higher image activity are allocated more output dynamic range by having higher values set in the slope array. The slope array is then checked against the maxslope array. The checking starts at the anchor point. If any value in the slope array is larger than the maxslope value, then the slope is set to the maxslope value and the difference is added to the next entry in the slope array. After this check-and-clip process is done, the slope array is integrated in step 170 to obtain the upper part of the tone scale curve for the upper range. The same procedure is repeated for the lower range to construct the lower part of the tone scale curve. Once the entire curve is constructed and the aim point is checked to be within specification, the tone scale curve is produced as a lookup table. The input image is mapped through the tone scale lookup table to produce the desired output image.

Figure 8:
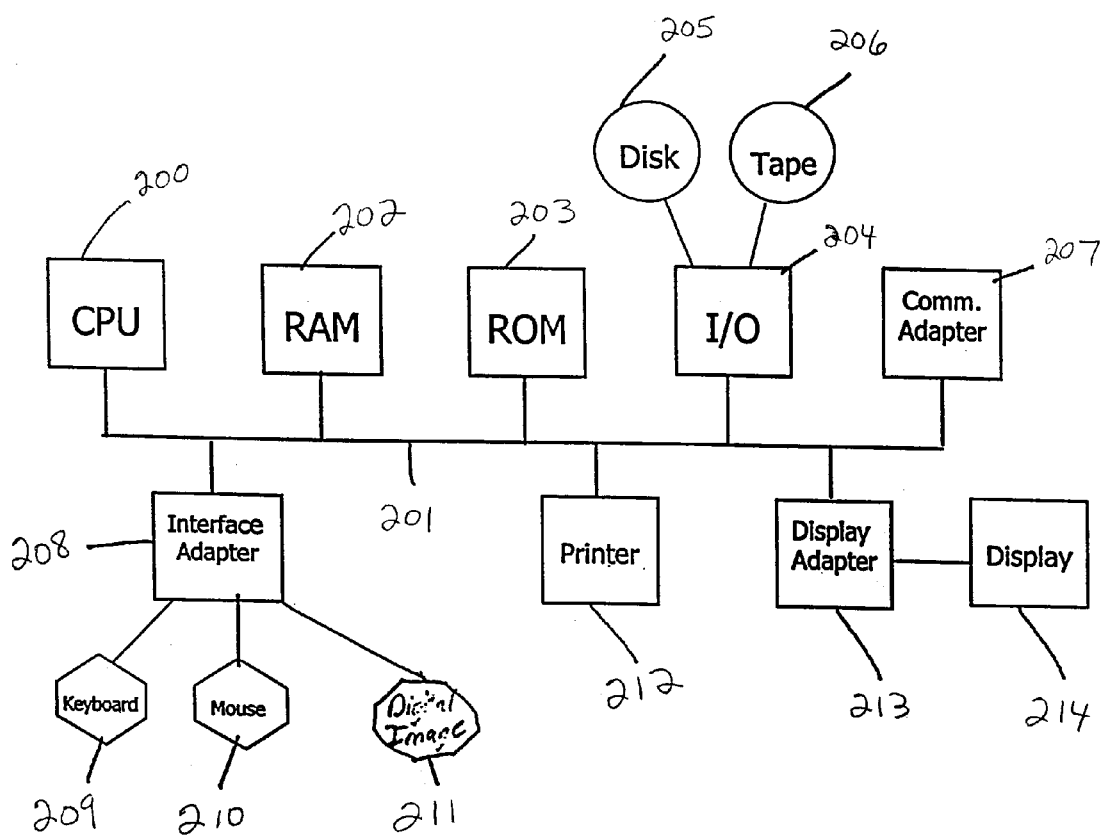
FIG. 8 is a diagram of a computer system for implementing the present invention.

While the overall methodology of the invention is described above, the invention can be embodied in any number of different types of systems and executed in any number of different ways, as would be known by one ordinarily skilled in the art. For example, as illustrated in FIG. 8, a typical hardware configuration of an information handling/computer system in accordance with the invention preferably has at least one processor or central processing unit (CPU) 200. The CPU 200 is interconnected via a system bus 201 to a random access memory (RAM) 202, a read-only memory (ROM) 203, an input/output (I/O) adapter 204 (for connecting peripheral devices such as disk units 205 and tape drives 206 to the bus 201), a communication adapter 207 (for connecting an information handling system to a data processing network), a user interface adapter 208 (for connecting peripherals 209, 210, 211 such as a keyboard, mouse, digital image input unit and/or other user interface device to the bus 201), a printer 212 and a display adapter 213 (for connecting the bus 201 to a display device 214). The invention could be implemented using the structure shown in FIG. 8 by including the inventive method within a computer program stored on the storage device 205. Such a computer program would act on an image frame supplied through the interface adapter 208 or through the network connection 207. The system would then automatically produce the desired tone scale response on the processed image, which would be output to the display 214, the printer 212, the network 207 or whatever other output medium/device would be warranted under the circumstances.

The invention has been described with reference to a preferred embodiment. However, it will be appreciated that variations and modifications can be effected by a person of ordinary skill in the art without departing from the scope of the invention.

| PARTS LIST | |
|---|---|
| 10 | image value histogram generation stage |
| 12 | input dynamic range computation stage |
| 14 | scene balance stage |
| 16 | white-pixel histogram computation stage |
| 18 | skin-pixel histogram computation stage |
| 20 | anchor point stage |
| 22 | image activity stage |
| 24 | tone scale construction stage |
| 26 | dynamic range parameters |
| 28 | slope and point constraints |
| 30 | tone scale curve |
| 32 | output curve |
| 40 | white distribution |
| 42 | skin distribution |
| 100–180 | steps |
| 200 | CPU |
| 201 | system bus |
| 202 | RAM |
| 203 | ROM |
| 204 | I/O adapter |
| 205 | disk unit |
| 206 | tape drive |
| 207 | communication adapter |
| 208 | user interface adapter |
| 209 | keyboard |
| 210 | mouse |
| 211 | digital image input/output unit |
| 212 | printer |
| 213 | display adapter |
| 214 | display device |

What is claimed is:

1. A method of generating an image-dependent tone scale curve in order to enhance a digital input image comprised of a plurality of image pixels, each pixel characterized by an image value that is input to the tone scale curve, said method comprising the steps of:

(a) computing image activity based on a specified degree of image modulation in the neighborhood of an input pixel;

(b) utilizing the image activity to compute an image activity histogram for an input image value as a function of the number of neighboring pixels that have a predetermined amount of image modulation exclusive of a predetermined noise modulation; and (c) constructing an image-dependent tone scale curve from the image activity histogram.

2. The method as claimed in claim 1 wherein the predetermined amount of image modulation computed in step (b) comprises an image value within two specified intervals each bounded by a noise threshold and a modulation threshold.

3. A method of generating a tone scale curve that optimizes the rendering of image activity under one or more constraints, said tone scale curve operating upon a digital input image comprised of a plurality of image values that are input to the tone scale curve, said method comprising the steps of:

(a) establishing one or more slope-limit constraints;

(b) constructing a tone scale slope function by applying the slope-limit constraints in a tone scale derivative space;

(c) computing an image activity histogram from a measure of image activity;

(d) applying the image activity histogram to the tone scale slope function; and (e) integrating the tone scale slope function to generate the tone scale curve.

4. The method as claimed in claim 3 further comprising:

(f) establishing one or more point constraints; and (g) constructing the tone scale slope function in a piecewise manner by applying the point constraints in the tone scale derivative space.

5. The method as claimed in claim 4 wherein the point constraints comprise at least one of a balance point and a white point.

6. The method claimed in claim 3 wherein the image activity measure in step (c) is measured by the response of the input image to a bandpass or highpass filter.

7. The method claimed in claim 3 wherein the image activity measure in step (c) is measured by the gray level co-occurrence statistics of the input image.

8. The method claimed in claim 3 wherein the image activity measure in step (c) is measured by counting, for each pixel in the input image, the number of neighboring pixels that have an image value within two specified intervals, which are bounded by noise thresholds and modulation thresholds.

9. The method claimed in claim 3 wherein the image activity measure in step (c) is measured by the response of the input image to an image gradient operator.

10. The method claimed in claim 3 wherein the image activity measure in step (c) is measured by counting the number of level-crossings for each input image value.

11. The method as claimed in claim 3 wherein the slope-limit constraint comprises a skin contrast constraint.

12. A method of generating a tone scale curve that optimizes the rendering of image activity under one or more constraints, said tone scale curve operating upon a digital input image comprised of a plurality of image values that are input to the tone scale curve, said method comprising the steps of:

(a) establishing one or more point constraints;

(b) constructing a tone scale slope function in a piecewise manner by applying the point constraints in a tone scale derivative space;

(c) computing an image activity histogram from a measure of image activity;

(d) applying the image activity histogram to the tone scale slope function; and (e) integrating the tone scale slope function to generate the tone scale curve.

13. The method as claimed in claim 12 further comprising:

(f) establishing one or more slope-limit constraints; and (g) constructing the tone scale slope function by applying the slope-limit constraints in the tone scale derivative space.

14. The method as claimed in claim 12 wherein the point constraints comprise at least one of a balance point and a white point.

15. The method as claimed in claim 13 wherein the slope-limit constraint comprises a skin contrast constraint.

16. The method claimed in claim 12 wherein the image activity measure in step (c) is measured by counting, for each pixel in the input image, the number of neighboring pixels that have an image value within two specified intervals, which are bounded by noise thresholds and modulation thresholds.

17. A method of generating a tone scale curve that optimizes the rendering of image activity under a set of slope-limit constraints, said tone scale curve operating upon a digital input image comprises of a plurality of image values that are input to the tone scale curve, said method comprising the steps of:

(a) choosing an anchor point for the input image;

(b) storing the slope limits in at least one slope constraint array;

(c) computing an image activity histogram;

(d) copying a minimum slope limit from the slope constraint array to a slope array;

(e) computing the available output dynamic range on both sides the anchor point by subtracting the integral of the slope array from a total output dynamic range;

(f) distributing the available output dynamic range over the slope array according to the image activity histogram;

(g) comparing the values in the slope array against those in the slope-constraint array and resetting the values in the slope array within the limits specified in the slope-constraint array; and (h) integrating the slope array to obtain the desired tone scale curve.

18. A method of generating a tone scale curve that preserves the contrast of skin or facial regions in the image, said tone scale curve operating upon a digital input image comprises of a plurality of image values that are input to the tone scale curve, said method comprising the steps of:

(a) detecting skin or facial pixels in the input image;

(b) forming a skin pixel histogram;

(c) computing a tonal range of the skin pixels from the skin pixel histogram; and (d) constraining a slope of the tonal range of the skin pixels on the tone scale curve to user specified slope limits.

19. A method of generating a tone scale curve that preserves the brightness of white objects, said tone scale curve operating upon a digital input image comprised of a plurality of image values that are input to the tone scale curve, said method comprising the steps of:

(a) determining a balance point;

(b) detecting white pixels in the input image, where each white pixel is a predetermined amount above the balance point;

(c) forming a white pixel histogram;

(d) computing a minimum white point of the white pixels from the white pixel histogram; and (e) forcing the tone scale curve to go through the minimum white point.

20. A computer program product for generating an image-dependent tone scale curve in order to enhance a digital input image comprised of a plurality of image pixels, each pixel characterized by an image value that is input to the tone scale curve, said computer program product comprising: a computer readable storage medium having a computer program stored thereon for performing the steps of:

(a) computing image activity based on a specified degree of image modulation in the neighborhood of an input pixel:

(b) utilizing the image activity to compute an image activity histogram for an input image value as a function of the number of neighboring pixels that have a predetermined amount of image modulation exclusive of a predetermined noise modulation; and (c) constructing an image-dependent tone scale curve from the image activity histogram.

21. The computer program product as claimed in claim 20 wherein the predetermined amount of image modulation computed in step (b) comprises an image value within two specified intervals each bounded by a noise threshold and a modulation threshold.

22. A computer program product for generating a tone scale curve that optimizes the rendering of image activity under one or more constraints, said tone scale curve operating upon a digital input image comprised of a plurality of image values that are input to the tone scale curve, said computer program product comprising: a computer readable storage medium having a computer program stored thereon for performing the steps of:

(a) establishing one or more slope-limit constraints;

(b) constructing a tone scale slope function by applying the slope-limit constraints in a tone scale derivative space;

(c) computing an image activity histogram from a measure of image activity;

(d) applying the image activity histogram to the tone scale slope function; and (e) integrating the tone scale slope function to generate the tone scale curve.

23. The computer program product as claimed in claim 22 wherein the slope-limit constraint comprises a skin contrast constraint.

24. A computer program product for generating a tone scale curve that optimizes the rendering of image activity under one or more constraints, said tone scale curve operating upon a digital input image comprised of a plurality of image values that are input to the tone scale curve, said computer program product comprising: a computer readable storage medium having a computer program stored thereon for performing the steps of:

(a) establishing one or more point constraints;

(b) constructing a tone scale slope function in a piecewise manner by applying the point constraints in a tone scale derivative space;

(c) computing an image activity histogram from a measure of image activity;

(d) applying the image activity histogram to the tone scale slope function; and (e) integrating the tone scale slope function to generate the tone scale curve.

25. The computer program product as claimed in claim 24 wherein the point constraints comprises at least one of a balance point and a white point.

* * * * *